(No Model.) 2 Sheets—Sheet 1.
C. C. WORTHINGTON.
MEANS FOR WITHDRAWING WATER OF CONDENSATION FROM STEAM CYLINDERS.
No. 309,277. Patented Dec. 16, 1884.
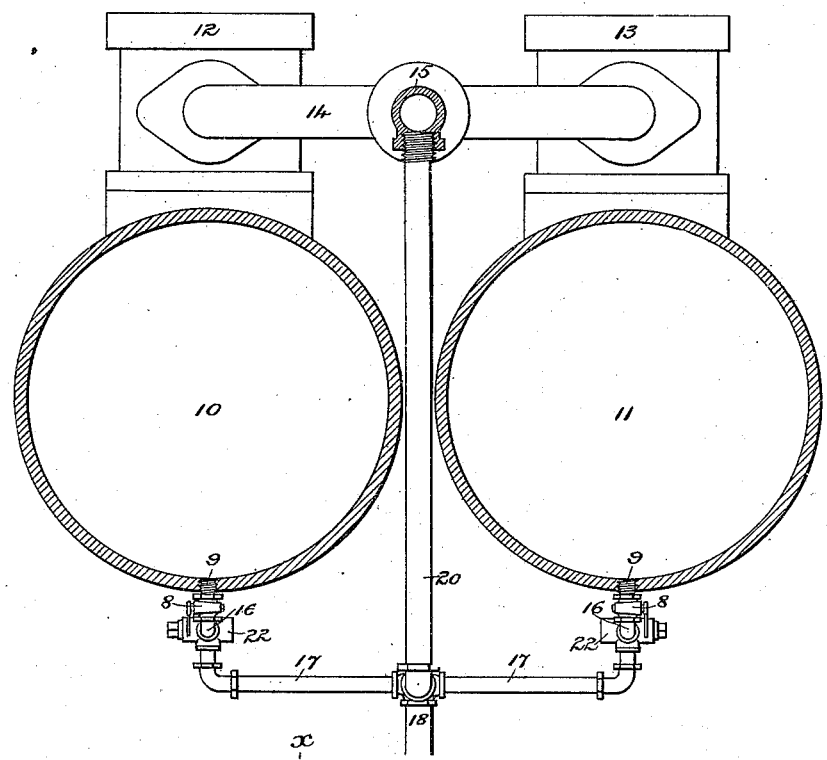
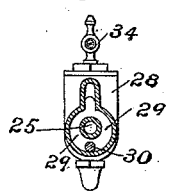
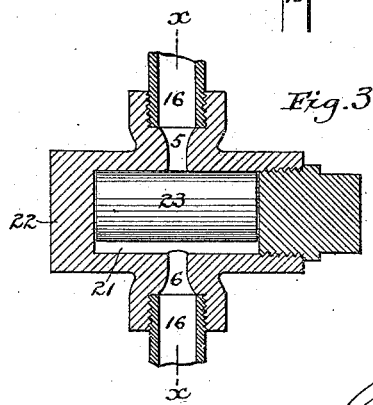
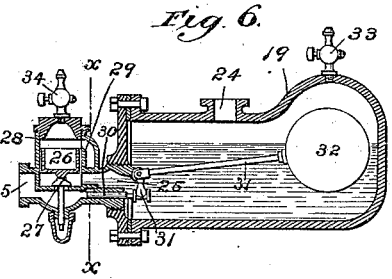
Attest:
A. N. Jasbera
Geo. H. Graham
Inventor.
Charles C. Worthington
by Munson & Philipp
Att'ys.

(No Model.)  2 Sheets—Sheet 2.
C. C. WORTHINGTON.
MEANS FOR WITHDRAWING WATER OF CONDENSATION FROM STEAM CYLINDERS.
No. 309,277.  Patented Dec. 16, 1884.
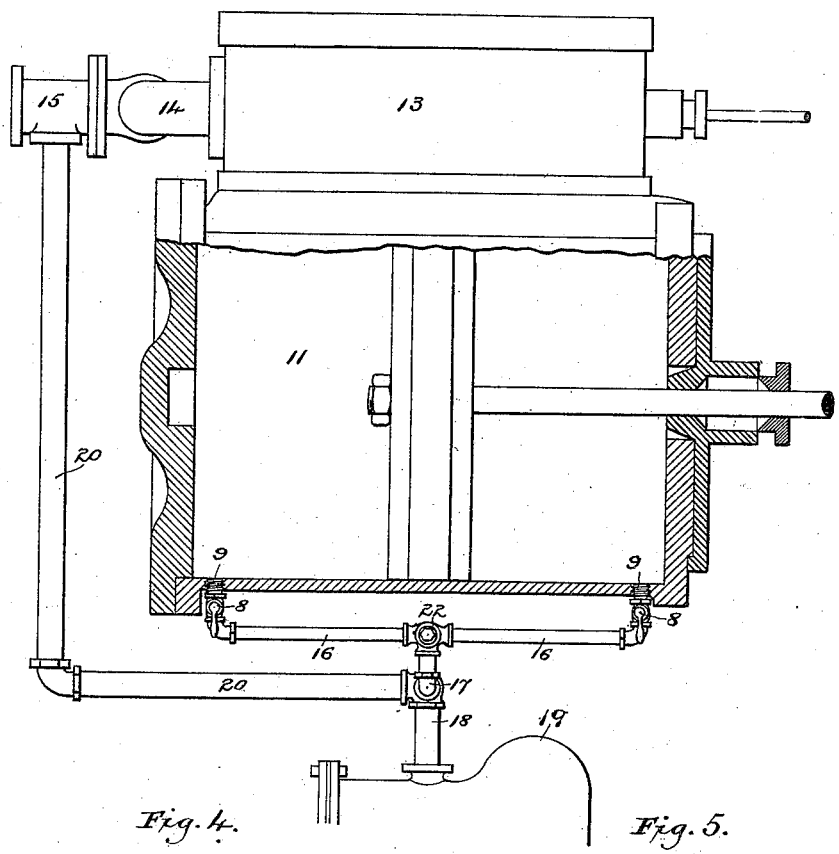
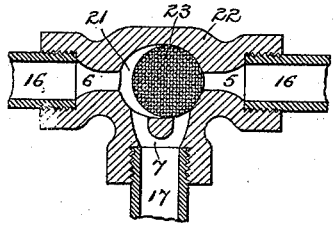
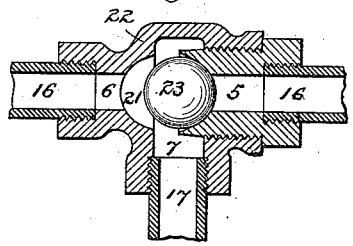
Attest:
A. N. Jasbera
Geo. H. Graham
Inventor,
Charles C. Worthington
by Munson & Philipp
Att'ys.

UNITED STATES PATENT OFFICE.

CHARLES C. WORTHINGTON, OF IRVINGTON, NEW YORK.

MEANS FOR WITHDRAWING WATER OF CONDENSATION FROM STEAM-CYLINDERS.

SPECIFICATION forming part of Letters Patent No. 309,277, dated December 16, 1884.

Application filed May 14, 1884. (No model.)

*To all whom it may concern:*

Be it known that I, CHARLES C. WORTHINGTON, a citizen of the United States, residing in the city of Irvington, county of Westchester and State of New York, have invented certain new and useful Improvements in Means for Withdrawing Water of Condensation from Steam-Cylinders, fully described and represented in the following specification and the accompanying drawings, forming a part of the same.

This invention relates to a means for clearing the steam pipes and cylinders of steam-engines of the water which accumulates therein as the result of the condensation of the steam, it being the object of the invention to provide a simple and effective means by which this result can be accomplished without the loss of any of the live steam, and in the case of condensing-engines without destroying the partial vacuum in the exhaust end of the cylinder, and thus impairing the efficiency of the condenser.

To this end the invention consists, generally, in a system of drain-pipes leading from the cylinder or cylinders to a steam trap or traps, and provided with a suitable valve or valves so arranged that the steam cannot pass from the end of the cylinder into which it is being admitted, or from the trap into the opposite end of the cylinder from which the steam is being exhausted.

The invention also embraces connections by which the water resulting from condensation is drained directly from the supply pipe or pipes to a steam-trap, and also various details of construction and combinations of parts in the means employed for effecting these results, all of which will be hereinafter fully explained, and particularly pointed out in connection with the accompanying drawings, in which—

Figure 1 is an end elevation, partly in section, of an ordinary duplex engine provided with the present invention. Fig. 2 is a partial side elevation, also partly in section, of the same. Fig. 3 is a horizontal section, upon an enlarged scale, of one form of check-valve for preventing the steam from passing from the end of the cylinder into which it is being admitted, and from the trap into the opposite end of the cylinder from which the steam is being exhausted. Fig. 4 is a vertical section taken upon the line $x\,x$ of Fig. 3. Fig. 5 is a similar view showing a valve of a slightly different construction. Fig. 6 is a sectional elevation of the steam-trap; and Fig. 7 is a cross-section of the same, taken upon the line $x\,x$ of Fig. 6.

Referring to said figures, it is to be understood that 10 11 are the cylinders, and 12 13 the steam-chests, of an ordinary duplex engine. The steam-chests 12 13 are connected in the usual manner through a T, 14, with the main steam-pipe, 15, by which they receive steam from the generator or other source of supply, and with exhaust-openings, (not shown,) through which the steam is exhausted after performing its work in the cylinders. Each of the cylinders 10 11 is provided upon its under side, and at points near its opposite ends, with small openings 9, which communicate by pipes 16, extending lengthwise of the cylinders, with a cross-pipe, 17, which in turn communicates through a branch, 18, with a steam-trap, 19. The pipes 14 15, through which the steam passes to the chests 12 13, are also provided with a small branch pipe, 20, which leads directly to the steam-trap 19, the purpose of which will be hereinafter explained. Each of the pipes 16 is provided with a cock, 8, by which it can be closed, so as to shut off communication between the cylinders and the trap 19, when desired. These pipes are also provided with suitable valves, which operate to permit the steam and water to pass from the end of the cylinder which is receiving the steam to the trap, but to prevent the steam from passing either from that end of the cylinder or from the trap into the other end of the cylinder from which the steam is being exhausted. This result may be accomplished by providing each of the pipes 16 with an ordinary outwardly-opening check-valve located between the opening 9 and the junction of said pipe with the pipe 17. The same result can, however, be more readily accomplished by means of a single valve located at the point of junction of the pipes 16 17, and arranged to open and close communication between the trap 19 and the opposite ends of the cylinder alternately. Such a valve may be constructed in a variety of ways, two constructions which I regard as suitable for the purpose being illustrated in the present case. In both of these constructions the valve is located in a chamber, 21, formed in a shell, 22, which is provided with three ports, 5 6 7, the ports 5 6 opening from opposite sides of the chamber 21 into the pipes 16, while the port 7 opens downward into the pipe 17, as shown in Figs. 4 and 5. The valve-chamber 21 may be of any desired form, but will preferably be of cylindrical form, as shown in Figs. 1, 2, 3, and 4, the valve 23, which is composed of metal, rubber, or other suitable material, being of corresponding form, and of a size somewhat less than that of the chamber. The valve-chamber and valve may, however, be of spherical form, as shown in Fig. 5, the ports 5 6 7 being arranged in the same manner as in the other construction. With a valve constructed and arranged in either of these ways, it will readily be seen that whenever the pressure in one of the pipes 16 becomes greater than it is in the other—as when steam is being admitted to one end of the cylinder and exhausted from the other—the valve 23 will be forced over to one side of the chamber 21, so as to open communication between the port 7 and one or the other of the ports 5 6, and at the same time close the other of the ports 5 6, so as to shut off communication with the exhaust end of the cylinder.

The operation of the apparatus just described is as follows: Whenever in operating the engine it becomes necessary to clear the cylinders of any water which may accumulate therein from the condensation of the steam, it is only necessary to open the cocks 8. When this is done the steam, as it is admitted into either end of the cylinders, will pass through the opening 9 and enter the pipe 16. The exhaust-port of the opposite end of the cylinder being, however, at that time open, there will be a minus pressure in the opposite pipe, 16, so that the valve 23 will be at once forced over to the opposite side of the chamber 21, as shown in Figs. 3, 4, and 5, so as to open communication between the end of the cylinder which is receiving steam and the trap 19, and thus permit the water of condensation to drain out of the cylinder and into the trap, the trap acting in the well-known manner to conduct the water away, but at the same time prevent the escape of any of the live steam from the cylinder to the open air, while the valve 23 at the same time prevents any portion of the steam from the cylinder or from the trap from passing to the exhaust end of the cylinder and becoming wasted, and also, if the engine is of the condensing type, preventing the destruction of the partial vacuum in the exhaust end of the cylinder, and thus impairing the efficiency of the condenser. As soon as the piston has completed its stroke and steam is admitted upon its opposite side the operation will be reversed, the valve 23 being forced over to the opposite side of the chamber 21, so as to close the other of the ports 5 6 and open communication between the other end of the cylinder and the trap 19. Whatever water accumulates in the pipes 14 15 that is not drawn into the steam-cylinders will pass without hinderance through the pipe 20 into the trap, the trap operating as just stated to prevent the escape of the steam. This is a feature of considerable importance.

The trap 19 may be of any of the common and well-known constructions. The well-known Curtis trap has, however, been selected for the purpose of illustration in the present case. This trap consists of a casing or body, 19, having an induction-opening, 24, to which the pipe 18 is connected, and through which the water and steam enters the trap, and an outlet pipe or passage, 25, through which the water is conducted out of the trap. The pipe 25 is controlled by a weighted valve, 27, to the top of which is secured a small piston or plunger, 26, which fits loosely in a small cylinder, 28, located upon the top of the pipe 25. The upper end of the cylinder 28 communicates through a passage, 29, with the passage 25 upon the under or outer side of the valve 27. The passage 29 is controlled by a sliding plunger, 30, the inner end of which extends into the trap-casing, and is connected to one arm of a bell-crank lever, 31, the other arm of which is provided with a float, 32. The casing 19 and the cylinder 28 are provided with relief-cocks 33 34, by which the air can be allowed to escape from the casing and cylinder when found necessary.

The operation of the trap thus constructed is as follows: The water passing through the pipe 18 will accumulate in the trap, and will pass upward between the plunger 26 and the walls of the cylinder 28, so as to compress the air or steam confined in the upper end of the cylinder until the float 32 is raised far enough to partially withdraw the plunger 30 and open the passage 29. As soon as this takes place the air or steam confined in the upper end of the cylinder 28 will escape through the passages 29 25. This will remove the pressure from the plunger 26, so that the pressure of the water below the plunger will raise the same and open the valve 27, and thus permit the water in the trap to pass through the valve-opening and escape. As the water is drawn from the trap the float 32 will be lowered, so as to again move the plunger 30 outward and close the passage 29, after which the valve 27 will move back to its seat and stop the further egress of water from the trap. It will be observed that the parts are so positioned that the water in the trap is never allowed to fall below the upper edge of the passage 25, so that none of the live steam is permitted to escape when the valve 27 is raised.

Although the invention is herein shown as applied to a duplex engine, it is, of course, to be understood that it is equally applicable to reciprocating engines of all other constructions. It is also to be understood that the arrangement of the drain pipes and valves may be varied considerably from that shown without departing from the principle of the invention. For example, the pipes 16 of the two cylinders, instead of communicating with the single pipe 17, may be provided with independent pipes leading to the steam-trap, or each of the openings 9 may be provided with an independent pipe leading directly to the trap, each of said pipes being provided with an outwardly-opening check-valve, to prevent the steam from passing from the trap into the end of the cylinder from which the steam is being exhausted.

The pipe 20 may be connected with a separate trap from that to which the pipes 16 are attached, if it is found under any circumstances preferable.

What I therefore claim is—

1. In a steam-engine, the combination, with the steam-cylinder, of a steam-trap, a pipe or pipes for conducting the water from each end of said cylinder to said trap, and a valve or valves arranged to prevent the passage of the steam from one end of the cylinder to the other, and from the trap to the end of the cylinder from which the steam is being exhausted, substantially as described.

2. In a steam-engine, the combination, with the steam pipe or pipes for supplying the cylinder or cylinders with steam, of a steam-trap and a pipe connecting said trap with the supply pipe or pipes, and arranged to conduct the water from said supply pipe or pipes to said trap, substantially as described.

3. In a steam-engine, the combination, with the steam-cylinder and the pipe or pipes for supplying the same with steam, of a steam trap or traps, pipes for conducting the water from said supply pipe or pipes and from each end of said cylinder to said trap or traps, and a valve or valves arranged to prevent the passage of the steam from one end of said cylinder to the other, and from the trap or traps to the end of the cylinder from which the steam is being exhausted, substantially as described.

4. In a steam-engine, the combination, with the steam-cylinder, of a steam-trap, pipes 16, communicating with the opposite ends of said cylinder and said trap, and a single valve arranged to shut off communication between said trap and the end of said cylinder from which the steam is being exhausted, substantially as described.

5. In a duplex engine, the combination, with the steam-cylinders, of a steam-trap, pipes 16, communicating with said trap and the opposite ends of said cylinders, and valves for preventing the passage of the steam from one end to the other of said cylinders, and from said trap to the ends of the cylinders from which the steam is being exhausted, substantially as described.

6. In a duplex engine, the combination, with the steam-cylinders and the pipe or pipes for supplying them with steam, of a steam-trap, a pipe, 20, leading from said supply pipe or pipes to said trap, pipes 16, communicating with said trap and the opposite ends of said cylinders, and valves for preventing the passage of the steam from one end to the other of said cylinders, and from said trap to the ends of the cylinders from which the steam is being exhausted, substantially as described.

In testimony whereof I have hereunto set my hand in the presence of two subscribing witnesses.

CHARLES C. WORTHINGTON.

Witnesses:
W. A. P. BICKNELL,
D. H. JOHNSON.